(12) United States Patent
Wang et al.

(10) Patent No.: US 11,690,020 B2
(45) Date of Patent: Jun. 27, 2023

(54) POWER SCALING FOR UPLINK FULL POWER TRANSMISSIONS IN NEW RADIO SYSTEMS

(71) Applicant: Intel Corporation, Santa Clara, CA (US)

(72) Inventors: Guotong Wang, Beijing (CN); Alexei Davydov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 112 days.

(21) Appl. No.: 16/994,475

(22) Filed: Aug. 14, 2020

(65) Prior Publication Data

US 2020/0383062 A1    Dec. 3, 2020

Related U.S. Application Data

(60) Provisional application No. 62/887,478, filed on Aug. 15, 2019.

(51) Int. Cl.
*H04W 52/14* (2009.01)
*H04L 5/00* (2006.01)
*H04L 25/02* (2006.01)
*H04W 72/23* (2023.01)

(52) U.S. Cl.
CPC ......... *H04W 52/146* (2013.01); *H04L 5/0051* (2013.01); *H04L 25/0226* (2013.01); *H04W 72/23* (2023.01)

(58) Field of Classification Search
CPC ............. H04W 52/146; H04W 72/042; H04W 52/325; H04W 52/42; H04L 5/0051; H04L 25/0226; H04L 5/0057; H04L 5/0053
See application file for complete search history.

(56) References Cited

U.S. PATENT DOCUMENTS

2018/0324770 A1* 11/2018 Nogami ............... H04W 72/042
2021/0377876 A1* 12/2021 Jeon .................... H04W 24/08
2022/0182202 A1*  6/2022 Faxér ................... H04L 5/0048

OTHER PUBLICATIONS

3rd Generation Partnership Project; Technical Specification Group Radio Access Network; NR; Physical channels and modulation, 3GPP TS 38.211 V15.6.0 (Jun. 2019). (Year: 2019).*
3rd Generation Partnership Project; Technical Specification Group Radio Access Network; NR; Physical layer procedures for control; 3GPP TS 38.213 V15.6.0 (Jun. 2019). (Year: 2019).*
3GPP, "Technical Specification Group Radio Access Network; NR; Physical channels and modulation (Release 15)," 3GPP TS 38.211 V15.6.0 (Jun. 2019), 5G, 97 pages.
3GPP, "Technical Specification Group Radio Access Network; NR; Multiplexing and channel coding (Release 15)," 3GPP TS 38.212 V15.6.0 (Jun. 2019), 5G, 101 pages.

* cited by examiner

*Primary Examiner* — Shailendra Kumar
(74) *Attorney, Agent, or Firm* — Schwabe, Williamson & Wyatt, P.C.

(57) ABSTRACT

Methods, systems, and storage media are described for power scaling for uplink full power transmissions. In particular, some embodiments relate to configuring sounding reference signal (SRS) resources for physical uplink shared channel (PUSCH) transmissions. Other embodiments may be described and/or claimed.

19 Claims, 13 Drawing Sheets

100

Retrieving SRS configuration information from memory, wherein the SRS configuration information includes an indication of multiple SRS resources, wherein each respective SRS resource is associated with a respective antenna port of a user equipment (UE) for a first mode (Mode 1) of full power uplink operation, or the multiple SRS resources are associated with multiple antenna ports of the UE for a second mode (Mode 2) of full power uplink operation
105

Encoding a message for transmission to the UE that includes the SRS configuration information
110

200

Determining SRS configuration information that includes an indication of multiple SRS resources, wherein each respective SRS resource is associated with a respective antenna port of a user equipment (UE) for a first mode (Mode 1) of full power uplink operation, or the multiple SRS resources are associated with multiple antenna ports of the UE for a second mode (Mode 2) of full power uplink operation
205

Encoding a message for transmission to the UE that includes the SRS configuration information
210

FIG. 2

Table 6.3.1.5-1: Precoding matrix $W$ for single-layer transmission using two antenna ports.

| TPMI index | $W$ (ordered from left to right in increasing order of TPMI index) | | | | | | | |
|---|---|---|---|---|---|---|---|---|
| 0 – 5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | - | - |

FIG. 4A

Table 6.3.1.5-4: Precoding matrix $W$ for two-layer transmission using two antenna ports with transform precoding disabled.

| TPMI index | $W$ (ordered from left to right in increasing order of TPMI index) | | | |
|---|---|---|---|---|
| 0 – 2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ | |

FIG. 4B

Table 6.3.1.5-2: Precoding matrix $W$ for single-layer transmission using four antenna ports with transform precoding enabled.

| TPMI index | $W$ (ordered from left to right in increasing order of TPMI index) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\1\\-1\end{bmatrix}$ | $\frac{1}{2}\begin{bmatrix}1\\-j\\1\\-j\end{bmatrix}$ | $\frac{1}{2}\begin{bmatrix}1\\-j\\1\\j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\1\\-j\end{bmatrix}$ | $\frac{1}{2}\begin{bmatrix}1\\-1\\1\\-1\end{bmatrix}$ | $\frac{1}{2}\begin{bmatrix}1\\-j\\-1\\j\end{bmatrix}$ | $\frac{1}{2}\begin{bmatrix}1\\-1\\1\\-1\end{bmatrix}$ | $\frac{1}{2}\begin{bmatrix}1\\j\\-1\\-j\end{bmatrix}$ | $\frac{1}{2}\begin{bmatrix}1\\-1\\j\\-1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | - | - | - |

FIG. 4C

Table 6.3.1.5-3: Precoding matrix $W$ for single-layer transmission using four antenna ports with transform precoding disabled.

| TPMI index | $W$ (ordered from left to right in increasing order of TPMI index) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\j\end{bmatrix}$ | $\frac{1}{2}\begin{bmatrix}1\\1\\j\\1\end{bmatrix}$ | $\frac{1}{2}\begin{bmatrix}1\\1\\-1\\-j\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | – | – | – | – |

FIG. 4D

Table 6.3.1.5-5: Precoding matrix $W$ for two-layer transmission using four antenna ports with transform precoding disabled.

| TPMI index | $W$ (ordered from left to right in increasing order of TPMI index) | | | |
|---|---|---|---|---|
| 0 – 3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4 – 7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8 – 11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12 – 15 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2\sqrt{2}}\begin{bmatrix}1&1\\1&1\\1&-1\\1&-1\end{bmatrix}$ | $\frac{1}{2\sqrt{2}}\begin{bmatrix}1&1\\1&1\\j&-j\\j&-j\end{bmatrix}$ |
| 16 – 19 | $\frac{1}{2\sqrt{2}}\begin{bmatrix}1&1\\j&j\\1&-1\\j&-j\end{bmatrix}$ | $\frac{1}{2\sqrt{2}}\begin{bmatrix}1&1\\j&j\\j&-j\\-1&1\end{bmatrix}$ | $\frac{1}{2\sqrt{2}}\begin{bmatrix}1&1\\-1&-1\\1&-1\\-1&1\end{bmatrix}$ | $\frac{1}{2\sqrt{2}}\begin{bmatrix}1&1\\-1&-1\\j&-j\\-j&j\end{bmatrix}$ |
| 20 – 21 | $\frac{1}{2\sqrt{2}}\begin{bmatrix}1&1\\-j&-j\\1&-1\\-j&j\end{bmatrix}$ | $\frac{1}{2\sqrt{2}}\begin{bmatrix}1&1\\-j&-j\\j&-j\\1&-1\end{bmatrix}$ | | |

FIG. 4E

Table 6.3.1.5-6: Precoding matrix $W$ for three-layer transmission using four antenna ports with transform precoding disabled.

| TPMI index | $W$ (ordered from left to right in increasing order of TPMI index) | | | |
|---|---|---|---|---|
| 0 – 3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4 – 6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & 1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | – |

FIG. 4F

Table 6.3.1.5-7: Precoding matrix $W$ for four-layer transmission using four antenna ports with transform precoding disabled.

| TPMI index | $W$ (ordered from left to right in increasing order of TPMI index) | | | |
|---|---|---|---|---|
| 0 – 3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | – | – | – |

FIG. 4G

Table 7.3.1.1.2-5: Precoding information and number of layers, for 2 antenna ports, if transform precoder is enabled, or if transform precoder is disabled and *maxRank* = 1

| Bit field mapped to index | codebookSubset = fullyAndPartialAndNonCoherent | Bit field mapped to index | codebookSubset = nonCoherent |
|---|---|---|---|
| 0 | 1 layer: TPMI=0 | 0 | 1 layer: TPMI=0 |
| 1 | 1 layer: TPMI=1 | 1 | 1 layer: TPMI=1 |
| 2 | 1 layer: TPMI=2 | | |
| 3 | 1 layer: TPMI=3 | | |
| 4 | 1 layer: TPMI=4 | | |
| 5 | 1 layer: TPMI=5 | | |
| 6-7 | reserved | | |

FIG. 4H

Table 7.3.1.1.2-4: Precoding information and number of layers, for 2 antenna ports, if transform precoder is disabled and *maxRank* = 2

| Bit field mapped to index | codebookSubset = fullyAndPartialAndNonCoherent | Bit field mapped to index | codebookSubset = nonCoherent |
|---|---|---|---|
| 0 | 1 layer: TPMI=0 | 0 | 1 layer: TPMI=0 |
| 1 | 1 layer: TPMI=1 | 1 | 1 layer: TPMI=1 |
| 2 | 2 layers: TPMI=0 | 2 | 2 layers: TPMI=0 |
| 3 | 1 layer: TPMI=2 | 3 | reserved |
| 4 | 1 layer: TPMI=3 | | |
| 5 | 1 layer: TPMI=4 | | |
| 6 | 1 layer: TPMI=5 | | |
| 7 | 2 layers: TPMI=1 | | |
| 8 | 2 layers: TPMI=2 | | |
| 9-15 | reserved | | |

FIG. 4I

Table 7.3.1.1.2-3: Precoding information and number of layers for 4 antenna ports, if transform precoder is enabled, or if transform precoder is disabled and *maxRank* = 1

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| ... | ... | ... | ... | ... | ... |
| 3 | 1 layer: TPMI=3 | 3 | 1 layer: TPMI=3 | 3 | 1 layer: TPMI=3 |
| 4 | 1 layer: TPMI=4 | 4 | 1 layer: TPMI=4 | | |
| ... | ... | ... | ... | | |
| 11 | 1 layer: TPMI=11 | 11 | 1 layer: TPMI=11 | | |
| 12 | 1 layers: TPMI=12 | 12-15 | reserved | | |
| ... | ... | | | | |
| 27 | 1 layers: TPMI=27 | | | | |
| 28-31 | reserved | | | | |

FIG. 4J

Table 7.3.1.1.2-2: Precoding information and number of layers, for 4 antenna ports, if transform precoder is disabled and *maxRank* = 2 or 3 or 4

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| ... | ... | ... | ... | ... | ... |
| 3 | 1 layer: TPMI=3 | 3 | 1 layer: TPMI=3 | 3 | 1 layer: TPMI=3 |
| 4 | 2 layers: TPMI=0 | 4 | 2 layers: TPMI=0 | 4 | 2 layers: TPMI=0 |
| ... | ... | ... | ... | ... | ... |
| 9 | 2 layers: TPMI=5 | 9 | 2 layers: TPMI=5 | 9 | 2 layers: TPMI=5 |
| 10 | 3 layers: TPMI=0 | 10 | 3 layers: TPMI=0 | 10 | 3 layers: TPMI=0 |
| 11 | 4 layers: TPMI=0 | 11 | 4 layers: TPMI=0 | 11 | 4 layers: TPMI=0 |
| 12 | 1 layer: TPMI=4 | 12 | 1 layer: TPMI=4 | 12-15 | reserved |
| ... | ... | ... | ... | | |
| 19 | 1 layer: TPMI=11 | 19 | 1 layer: TPMI=11 | | |
| 20 | 2 layers: TPMI=6 | 20 | 2 layers: TPMI=6 | | |
| ... | ... | ... | ... | | |
| 27 | 2 layers: TPMI=13 | 27 | 2 layers: TPMI=13 | | |
| 28 | 3 layers: TPMI=1 | 28 | 3 layers: TPMI=1 | | |
| 29 | 3 layers: TPMI=2 | 29 | 3 layers: TPMI=2 | | |
| 30 | 4 layers: TPMI=1 | 30 | 4 layers: TPMI=1 | | |
| 31 | 4 layers: TPMI=2 | 31 | 4 layers: TPMI=2 | | |
| 32 | 1 layers: TPMI=12 | | | | |
| ... | ... | | | | |
| 47 | 1 layers: TPMI=27 | | | | |
| 48 | 2 layers: TPMI=14 | | | | |
| ... | ... | | | | |
| 55 | 2 layers: TPMI=21 | | | | |
| 56 | 3 layers: TPMI=3 | | | | |
| ... | ... | | | | |
| 59 | 3 layers: TPMI=6 | | | | |
| 60 | 4 layers: TPMI=3 | | | | |
| 61 | 4 layers: TPMI=4 | | | | |
| 62-63 | reserved | | | | |

FIG. 4K

POWER SCALING FOR UPLINK FULL POWER TRANSMISSIONS IN NEW RADIO SYSTEMS

RELATED APPLICATIONS

This application claims priority to U.S. Provisional Patent Application No. 62/887,478 filed Aug. 15, 2019 and entitled "POWER SCALING FOR UPLINK FULL POWER TRANSMISSION IN NR," and to PCT Patent Application No. PCT/CN2019/109827 filed Oct. 4, 2019 and entitled "A METHOD FOR POWER SCALING FOR UPLINK FULL POWER TRANSMISSION IN NR," the entire disclosures of which are incorporated by reference in their entirety.

FIELD

Embodiments of the present disclosure relate generally to the technical field of wireless communications.

BACKGROUND

Among other things, embodiments of the present disclosure relate to power scaling for uplink full power transmissions. In particular, some embodiments relate to configuring sounding reference signal (SRS) resources for physical uplink shared channel (PUSCH) transmissions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

FIG. 4A illustrates an example of codebook for rank-1 with two antenna ports in accordance with some embodiments.

FIG. 4B illustrates an example of a codebook for rank-2 with two antenna ports in accordance with some embodiments.

FIG. 4C illustrates an example of a codebook for rank-1 with four antenna ports (transform precoding enabled) in accordance with some embodiments.

FIG. 4D illustrates an example of a codebook for rank-1 with four antenna ports (transform precoding disabled) in accordance with some embodiments.

FIG. 4E illustrates an example of a codebook for rank-2 with four antenna ports in accordance with some embodiments.

FIG. 4F illustrates an example of a codebook for rank-3 with four antenna ports in accordance with some embodiments.

FIG. 4G illustrates an example of a codebook for rank-4 with four antenna ports in accordance with some embodiments.

FIG. 4H illustrates an example of a codebook subset for two antenna ports and a maxRank of 1 in accordance with some embodiments.

FIG. 4I illustrates an example of a codebook subset for two antenna ports and a maxRank of 2 in accordance with some embodiments.

FIG. 4J illustrates an example of a codebook subset for four antenna ports and a maxRank of 1 in accordance with some embodiments.

FIG. 4K illustrates an example of a codebook subset for four antenna ports and a maxRank of 2, 3, or 4 in accordance with some embodiments.

DETAILED DESCRIPTION

Figure 1:
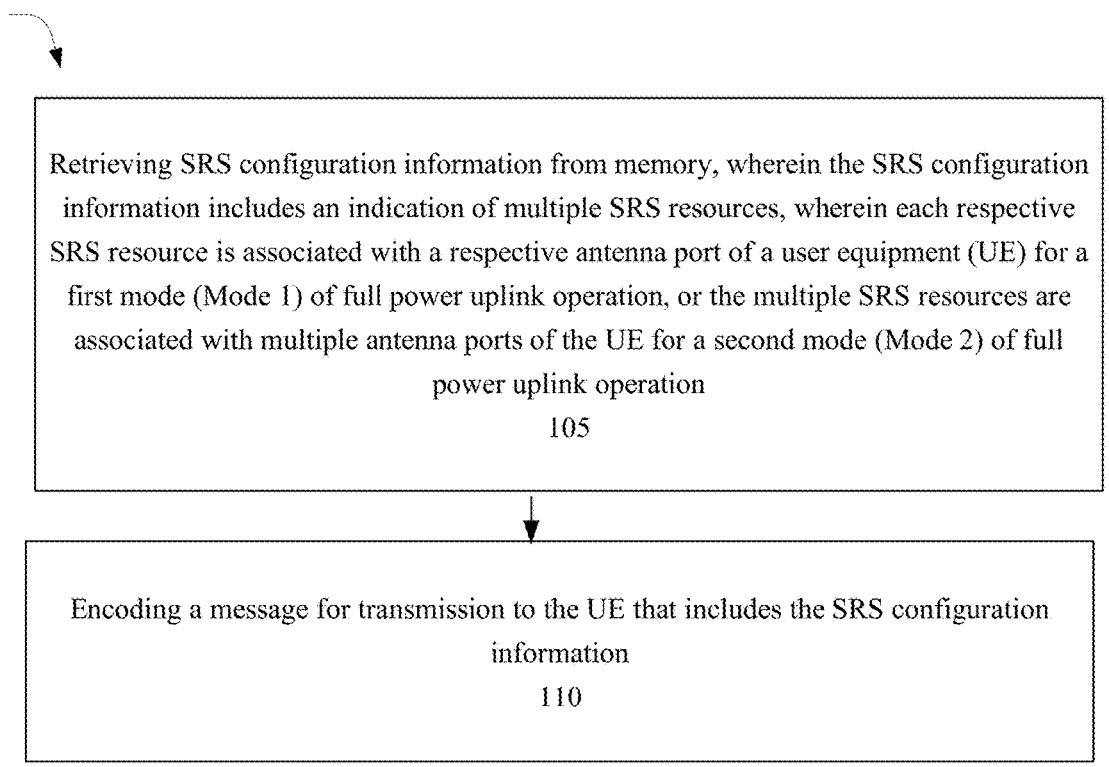

Among other things, embodiments of the present disclosure relate to power scaling for uplink full power transmissions. In particular, some embodiments relate to configuring sounding reference signal (SRS) resources for physical uplink shared channel (PUSCH) transmissions. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

5G NR Rel-15 specifies codebook based transmission for UL. Such transmission mode was designed considering different UE coherence capabilities, e.g., whether UE can maintain the relative phase among all (full coherence), or a subset (partial coherence), or none (non-coherence) of its transmit chains/antenna ports over time.

In Rel-15, a UE may be configured to operate with a subset of precoders in the UL codebook according to the reported coherence capability. Taking the UE with two antenna ports as an example, FIGS. 4A-4K illustrate examples of the uplink codebook and codebook subsets design in legacy NR Rel-15 specifications. FIG. 4A and FIG. 4B shows the codebook and TPMI (Transmission Precoding Matrix Index) mapping for two antenna ports with one layer and two layers transmission respectively. FIG. 4C illustrates codebook and TPMI mapping for single-layer transmission using four antenna ports with transform precoding enabled. FIGS. 4D-4G shows the codebook and TPMI mapping for one layer, two layers, three layers and four layers, respectively, with four antenna ports and transform precoding disabled.

The actual TPMI that should be used by the UE for the PUSCH transmission is indicated by DCI (Downlink Control Information). In order to optimize the signaling overhead the indication of TPMI precoder and the number of MIMO layers for such uplink transmission is indicated by common DCI field. FIG. 4H and FIG. 4I shows the example of the TPMI sets defining codebook subsets for different UE coherence capabilities.

Note that in the legacy 3GPP spec, full coherence, partial coherence, and non-coherent UE capabilities are identified as 'fullAndPartialAndNonCoherent', 'partialAndNonCoherent', and 'nonCoherent'. In addition, FIG. 4J and FIG. 4K shows the codebook subsets for the case of four UE antenna ports.

It should be noted that some coherence capability of the UE may not allow full power transmission. For example for UE with power class 3, the full transmission power is 23 dBm. If the UE has two antenna ports and power amplifiers (PA) with the maximum transmission power of 20 dBm, the full Tx power could not be achieved for non-coherent capable UE. More specifically for rank-1 (1 layer) only antenna selection precoder of $$\frac{1}{\sqrt{2}}\begin{bmatrix}1\\0\end{bmatrix} \text{ or } \frac{1}{\sqrt{2}}\begin{bmatrix}0\\1\end{bmatrix}$$

is supported for rank-1 transmission, which allows transmission either from the first or the second antenna with maximum power of 20 dBm.

In order to enable the full power transmission in uplink, in legacy NR Rel-16 defines two transmission modes for the following UE power amplifier architectures:

UE capability 1—Each PA can support full power transmission. For example, UE with two PAs and each PA can transmit with 23 dBm (23 dBm+23 dBm).

UE capability 2—Each PA cannot deliver full power. For example, UE with two PAs and the maximum Tx power of each PA is 20 dBm (20 dBm+20 dBm). Combining two PAs together, the full power transmission can be reached.

UE capability 3—A subset of the PAs can deliver full power. For example, UE with two PAs and one PA can deliver maximum power of 23 dBm and the other PA can deliver maximum power of 20 dBm (23 dBm+20 dBm).

For UE capability 1, the power control scheme will be modified to support the full power transmission. For UE capability 2 and UE capability 3, there is a legacy agreement to introduce two modes for full power uplink transmission. The operation of these two modes is briefly summarized as below:

Mode 1—The UE can be configured with one or more SRS resources with same number of SRS ports within an SRS resource set. A new codebook subset including at least the non-antenna selection precoder will be introduced to support full power transmission, for example, $$\frac{1}{\sqrt{2}}\begin{bmatrix}1\\1\end{bmatrix}.$$

Mode 2—The UE can be configured with one SRS resource or multiple SRS resources with different number of SRS ports within a SRS resource set. For capability 3, the UE should report TPMI(s) to the gNB, which can enable full power transmission, for example, $$\begin{bmatrix}1\\0\end{bmatrix} \text{ or } \begin{bmatrix}0\\1\end{bmatrix}.$$

For Mode 2 operation, the legacy Rel-15 codebook and codebook subsets are used. The UE needs to report which TPMIs could support full power transmission, for example, the antenna selection TPMI of $$\begin{bmatrix} 1 \\ 0 \end{bmatrix}.$$

However, in the legacy Rel-15 codebook, the corresponding antenna selection TPMI is $$\frac{1}{\sqrt{2}} \begin{bmatrix} 1 \\ 0 \end{bmatrix}$$

(TPMI Index 0 in FIG. 4A), which is different with what the UE expects due to the scaling factor of $$\frac{1}{\sqrt{2}}$$

and cannot enable the full power transmission. Thus it should be solved to enable the full power transmission.

In the legacy description TS 38.213, v. 15.6.0, 2019 Jun. 24, for power control, there includes the following text on power scaling: "[f]or a PUSCH transmission scheduled by a DCI format 0_1 or configured by ConfiguredGrantConfig or semiPersistentOnPUSCH, if txConfig in PUSCH-Config is set to 'codebook' and each SRS resource in the SRS-ResourceSet with usage set to 'codebook' has more than one SRS port, the UE scales the linear value by the ratio of the number of antenna ports with a non-zero PUSCH transmission power to the maximum number of SRS ports supported by the UE in one SRS resource. The UE splits the power equally across the antenna ports on which the UE transmits the PUSCH with non-zero power."

For Mode 2 operation, a UE is configured with SRS resources with different number of SRS antenna ports. In this case the above text defining the power assignment on antenna ports has some issues due to power scaling factor derived from the maximum number of antenna ports.

For example, for Mode 2 operation, a UE can be configured with two SRS resources with 2 and 4 antenna ports respectively. If the UE operates with rank 1 transmission with two antenna ports or four antenna ports, the power scaling corresponding to four antenna ports should be used, e.g. the Tx power is scaled down to ¼. In this case the full power transmission could not be achieved. Embodiments described herein may be directed to power scaling for uplink full power transmission.

For Mode 2 operation, it should be allowed to use different scaling factor for the existing TPMI precoders. And for Mode 2 operation, the power scaling down defined in power control should not be applied.

TPMI Scaling Factor

In one set of embodiments, for Mode 2 operation, the legacy Rel-15 codebook and codebook subsets are used. And the UE reports which TPMIs can enable full power transmission. In order to enable the full power transmission, it should be allowed to use different scaling factor for the existing TPMI precoders. For example, for rank 1 transmission with two antenna ports, the UE could report TPMI Index #0 or TPMI Index #1 enabling full power transmission. When gNB indicates TPMI Index #0, corresponding to the precoder $$\frac{1}{\sqrt{2}} \begin{bmatrix} 1 \\ 0 \end{bmatrix},$$

the UE can actually use the precoder of $$\begin{bmatrix} 1 \\ 0 \end{bmatrix}$$

for full power transmission.

In alternative embodiments, a new codebook can be defined for Mode 2 with the exact precodes that can support full power transmission. For example, the codebook include precodes of $$\begin{bmatrix} 1 \\ 0 \end{bmatrix} \text{ and } \begin{bmatrix} 0 \\ 1 \end{bmatrix}.$$

Power Scaling in Power Control

In another set of embodiments, for Mode 2 operation, when performing the scaling in power control, the scaling factor can be derived based on the TPMI and SRI. For example, the power scaling can be based on the number of antenna ports on which the UE transmits the PUSCH with non-zero power. E.g. the spec change would be:

For a PUSCH transmission scheduled by a DCI format 0_1 or configured by ConfiguredGrantConfig or semiPersistentOnPUSCH, if txConfig in PUSCH-Config is set to 'codebook' and each SRS resource in the SRS-ResourceSet with usage set to 'codebook' has more than one SRS port, the UE scales the linear value by the ratio of the number of antenna ports with a non-zero PUSCH transmission power to the number of antenna ports on which the UE transmits the PUSCH with non-zero power. The UE splits the power equally across the antenna ports on which the UE transmits the PUSCH with non-zero power.

In another set of embodiments, some restriction can be introduced, for example, for Mode 2 operation, where the power scaling defined in power control is not applied. For example, the following may be specified:

For a PUSCH transmission scheduled by a DCI format 0_1 or configured by ConfiguredGrantConfig or semiPersistentOnPUSCH, if txConfig in PUSCH-Config is set to 'codebook' and each SRS resource in the SRS-ResourceSet with usage set to 'codebook' has more than one SRS port and Mode 2 is not enabled for full power transmission, the UE scales the linear value by the ratio of the number of antenna ports with a non-zero PUSCH transmission power to the maximum number of SRS ports supported by the UE in one SRS resource. The UE splits the power equally across the antenna ports on which the UE transmits the PUSCH with non-zero power.

In another example, the following may be specified: "[f]or a PUSCH transmission scheduled by a DCI format 0_1 or configured by ConfiguredGrantConfig or semiPersistentOnPUSCH, if txConfig in PUSCH-Config is set to 'codebook' and each SRS resource in the SRS-ResourceSet with usage set to 'codebook' has more than one SRS port and the indicated TPMI is not antenna selection TPMI, the UE scales the linear value by the ratio of the number of antenna ports with a non-zero PUSCH transmission power to the maximum number of SRS ports supported by the UE in one SRS resource. The UE splits the power equally across the antenna ports on which the UE transmits the PUSCH with non-zero power."

Alternatively for Mode 2 operation, it could be restricted that a SRS resource with one SRS antenna port should be always configured. Thus the power scaling defined in the power control is not applied and there is no change to power scaling part defined in the power control.

In another embodiment, for Mode 1 operation, the UE could be configured with multiple SRS resources with the same number of antenna ports, and a new codebook subset will be introduced, which may include antenna selection TPMIs. Thus for Mode 1 operation, the Rel-15 power scaling factor could be reused. Alternatively, the power scaling factor is determined by the number of antenna ports with a non-zero PUSCH transmission power divided by the number of SRS ports in the SRS resource indicated by SRI.

In another embodiment, for Mode 2 operation, the UE could be configured with multiple SRS resources with different number of antenna ports. Thus for Mode 2 operation, the power scaling factor should not be derived from the maximum number of SRS antenna ports the UE can support. For Mode 2 operation, if the TPMI can support full power transmission, then the power scaling factor should be 1; if the TPMI can't support full power transmission, then the power scaling factor is determined by the number of non-zero power PUSCH ports divided by the actual number of SRS antenna ports in the SRS resource indicated by SRI.

Figure 5:
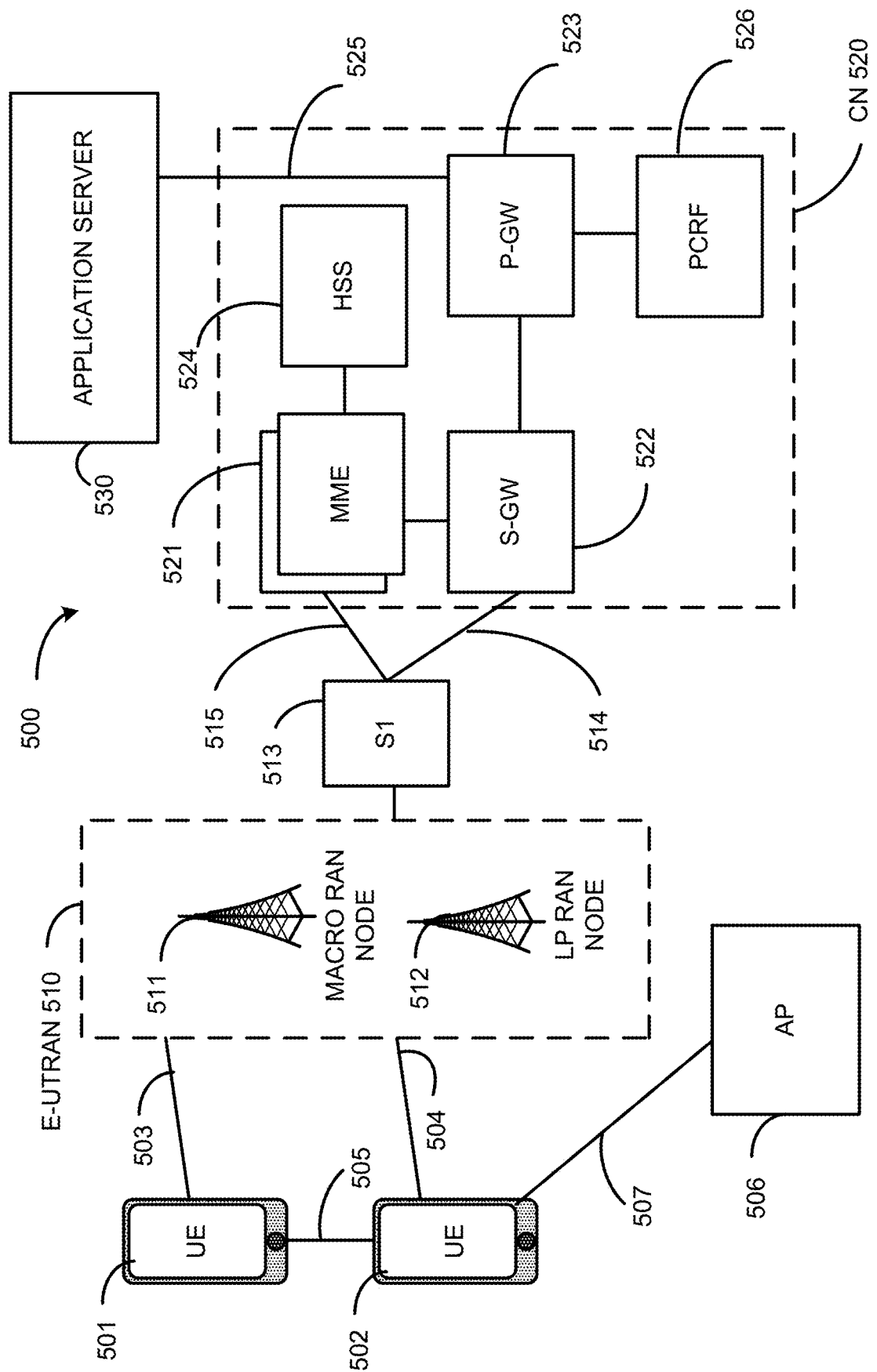
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
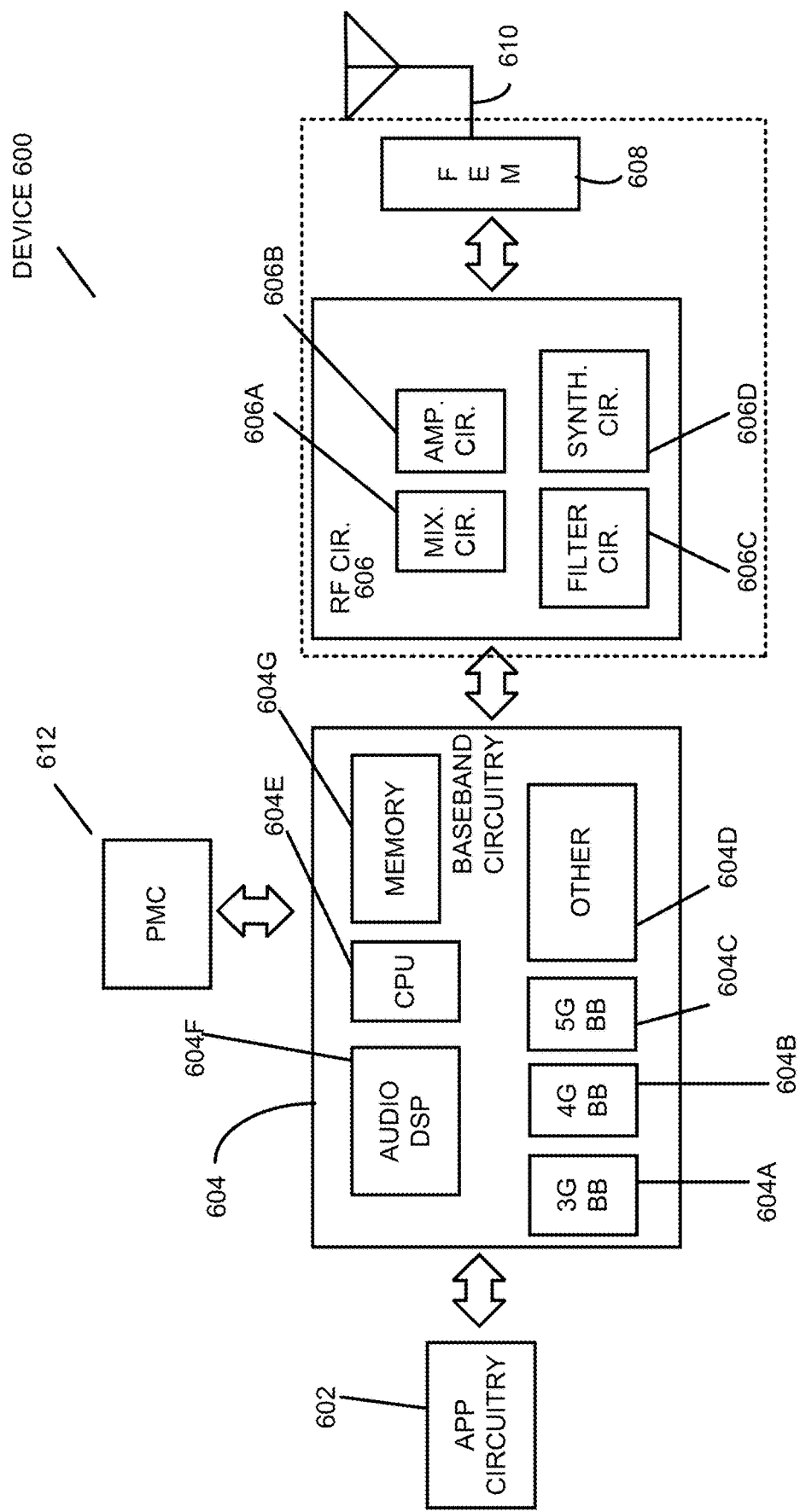
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
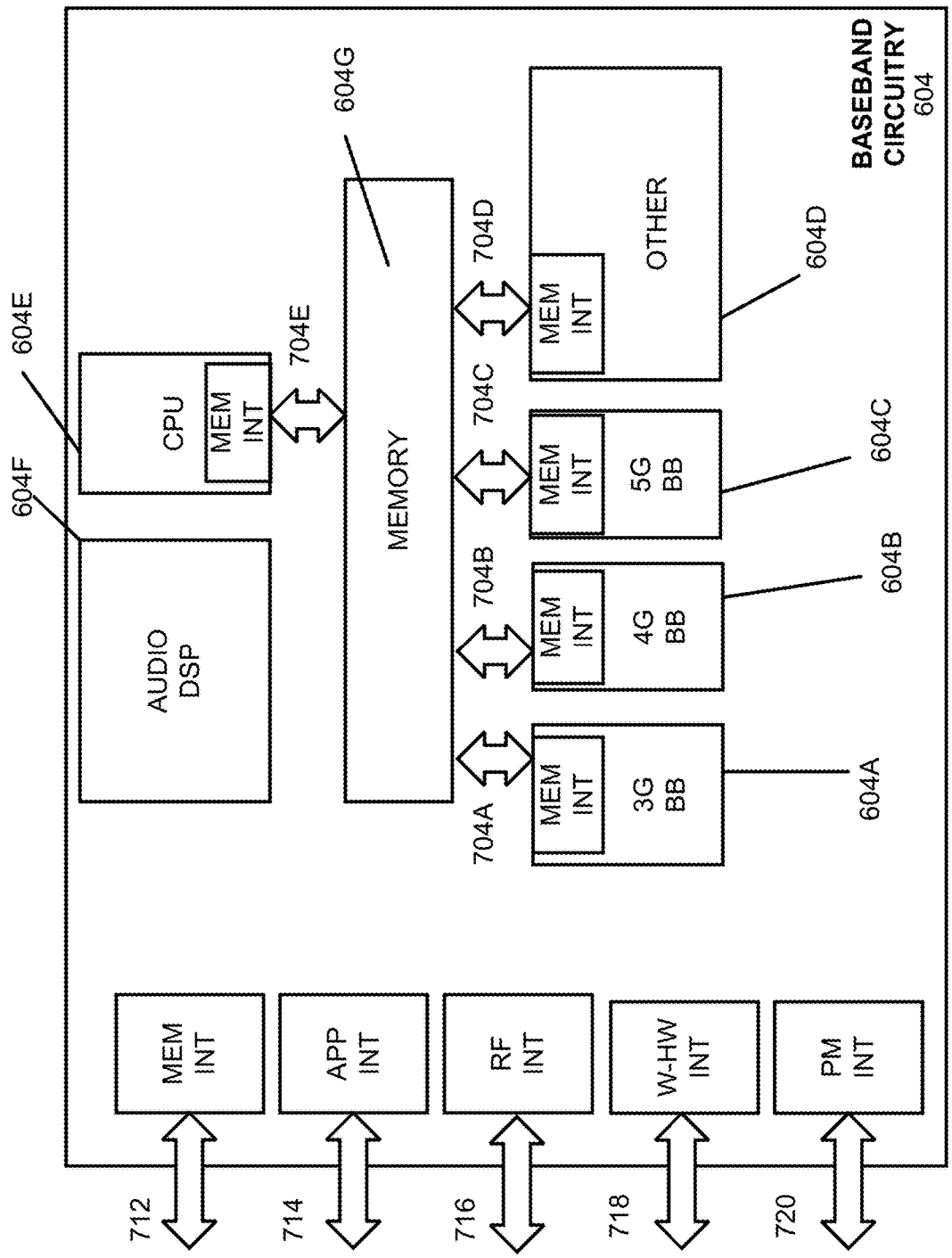
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
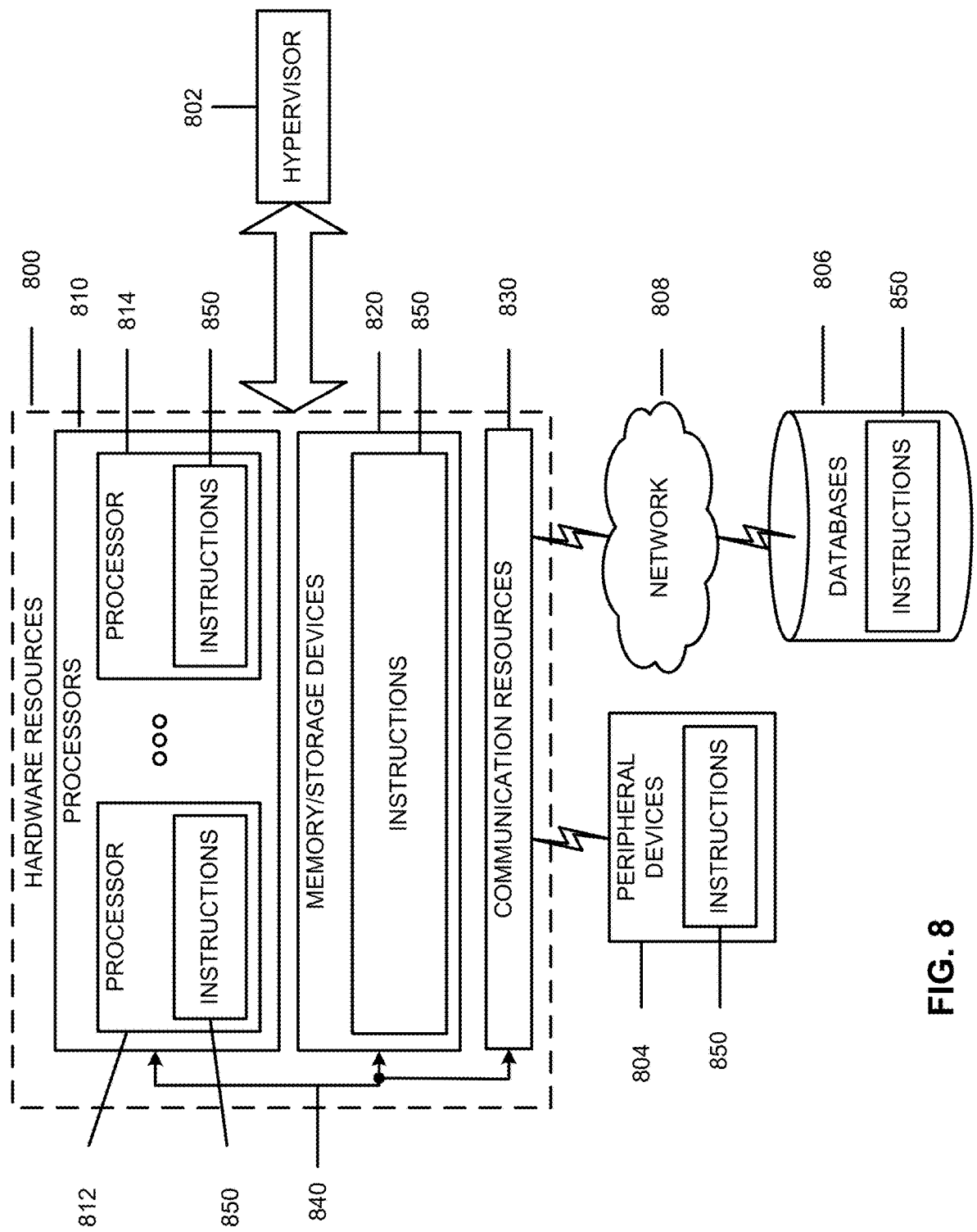
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Figure 3:
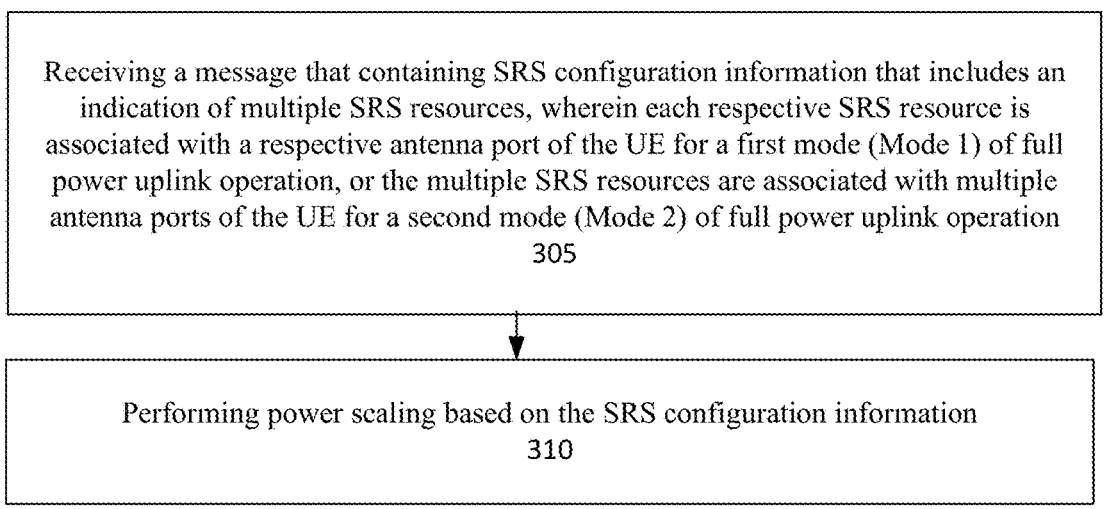

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by a next-generation NodeB (gNB) or portion thereof in some embodiments. In this example, operation flow/algorithmic structure 100 may include, at 105, retrieving SRS configuration information from memory, wherein the SRS configuration information includes an indication of multiple SRS resources, wherein each respective SRS resource is associated with a respective antenna port of a user equipment (UE) for a first mode (Mode 1) of full power uplink operation, or the multiple SRS resources are associated with multiple antenna ports of the UE for a second mode (Mode 2) of full power uplink operation. Operation flow/algorithmic structure 100 may further include, at 110, encoding a message for transmission to the UE that includes the SRS configuration information.

Another example of an operation flow/algorithmic structure is depicted in FIG. 2, which may be performed by a next-generation NodeB (gNB) or portion thereof in some embodiments. In this example, operation flow/algorithmic structure 200 may include, at 205, Determining SRS configuration information that includes an indication of multiple SRS resources, wherein each respective SRS resource is associated with a respective antenna port of a user equipment (UE) for a first mode (Mode 1) of full power uplink operation, or the multiple SRS resources are associated with multiple antenna ports of the UE for a second mode (Mode 2) of full power uplink operation. Operation flow/algorithmic structure 200 may further include, at 210, encoding a message for transmission to the UE that includes the SRS configuration information.

Another example of an operation flow/algorithmic structure is depicted in FIG. 3, which may be performed by a user equipment (UE) or portion thereof in some embodiments. In this example, operation flow/algorithmic structure 300 may include, at 305, receiving a message that containing SRS configuration information that includes an indication of multiple SRS resources, wherein each respective SRS resource is associated with a respective antenna port of the UE for a first mode (Mode 1) of full power uplink operation, or the multiple SRS resources are associated with multiple antenna ports of the UE for a second mode (Mode 2) of full power uplink operation. Operation flow/algorithmic structure 300 may further include, at 310, performing power scaling based on the SRS configuration information.

EXAMPLES

Some non-limiting examples are provided below.

Example 1 includes an apparatus comprising: memory to store sounding reference signal (SRS) configuration information; and processor circuitry, coupled with the memory, to: retrieve the SRS configuration information from the memory, wherein the SRS configuration information includes an indication of multiple SRS resources, wherein each respective SRS resource is associated with a respective antenna port of a user equipment (UE) for a first mode (Mode 1) of full power uplink operation, or the multiple SRS resources are associated with multiple antenna ports of the UE for a second mode (Mode 2) of full power uplink operation; and encode a message for transmission to the UE that includes the SRS configuration information.

Example 2 includes the apparatus of example 1 or some other example herein, wherein the DCI further includes an indication of a codebook subset associated with an antenna selection transmitted precoding matrix indicator (TPMI) for the Mode 1 operation.

Example 3 includes the apparatus of example 1 or some other example herein, wherein the SRS configuration information is included in downlink control information (DCI).

Example 4 includes the apparatus of example 3 or some other example herein, wherein the DCI is DCI format 0_1.

Example 5 includes the apparatus of example 1 or some other example herein, wherein the processing circuitry is further to receive a report from the UE that indicates one or more TPMIs capable of supporting full power transmission for the Mode 2 operation.

Example 6 includes one or more non-transitory computer-readable media storing instructions that, when executed by one or more processors, are to cause a next-generation NodeB (gNB) to: determine SRS configuration information that includes an indication of multiple SRS resources, wherein each respective SRS resource is associated with a respective antenna port of a user equipment (UE) for a first mode (Mode 1) of full power uplink operation, or the multiple SRS resources are associated with multiple antenna ports of the UE for a second mode (Mode 2) of full power uplink operation; and encode a message for transmission to the UE that includes the SRS configuration information.

Example 7 includes the one or more non-transitory computer-readable media of example 6 or some other example herein, wherein the DCI further includes an indication of a codebook subset associated with an antenna selection transmitted precoding matrix indicator (TPMI) for the Mode 1 operation.

Example 8 includes the one or more non-transitory computer-readable media of example 6 or some other example herein, wherein the SRS configuration information is included in downlink control information (DCI).

Example 9 includes the one or more non-transitory computer-readable media of example 8 or some other example herein, wherein the DCI is DCI format 0_1.

Example 10 includes the one or more non-transitory computer-readable media of example 6 or some other example herein, wherein the instructions are further to receive a report from the UE that indicates one or more TPMIs capable of supporting full power transmission for the Mode 2 operation.

Example 11 includes one or more non-transitory computer-readable media storing instructions that, when executed by one or more processors, cause a user equipment (UE) to: receive a message that containing SRS configuration information that includes an indication of multiple SRS resources, wherein each respective SRS resource is associated with a respective antenna port of the UE for a first mode (Mode 1) of full power uplink operation, or the multiple SRS resources are associated with multiple antenna ports of the UE for a second mode (Mode 2) of full power uplink operation; and perform power scaling based on the SRS configuration information.

Example 12 includes the one or more non-transitory computer-readable media of example 11 or some other example herein, wherein the power scaling for Mode 1 operation is determined based on a number of antenna ports with a non-zero physical uplink shared channel (PUSCH) transmission power divided by a maximum number of SRS ports in an SRS resource.

Example 13 includes the one or more non-transitory computer-readable media of example 11 or some other example herein, wherein the power scaling for Mode 1 operation is determined based on a number of antenna ports with a non-zero PUSCH transmission power divided by an actual number of SRS ports in an SRS resource.

Example 14 includes the one or more non-transitory computer-readable media of example 11 or some other example herein, wherein the power scaling for Mode 2 operation is determined to be 1 for a TPMI that can support full power transmission.

Example 15 includes the one or more non-transitory computer-readable media of example 11 or some other example herein, wherein the power scaling for Mode 2 operation is determined based on a number of non-zero PUSCH ports divided by a number of SRS antenna ports of the indicated SRS resource for a TPMI that cannot support full power transmission.

Example 16 includes the one or more non-transitory computer-readable media of example 11 or some other example herein, wherein the DCI further includes an indication of a codebook subset associated with an antenna selection transmitted precoding matrix indicator (TPMI) for the Mode 1 operation.

Example 17 includes the one or more non-transitory computer-readable media of example 11 or some other example herein, wherein the SRS configuration information is included in downlink control information (DCI).

Example 18 includes the one or more non-transitory computer-readable media of example 17 or some other example herein, wherein the DCI is DCI format 0_1.

Example 19 includes the one or more non-transitory computer-readable media of example 11 or some other example herein, wherein the instructions are further to encode, for transmission to a next-generation NodeB (gNB), a report that indicates one or more TPMIs capable of supporting full power transmission for the Mode 2 operation.

Example 20 may include an apparatus comprising means to perform one or more elements of a method described in or related to any of examples 1-19, or any other method or process described herein.

Example 21 may include one or more non-transitory computer-readable media comprising instructions to cause an electronic device, upon execution of the instructions by one or more processors of the electronic device, to perform one or more elements of a method described in or related to any of examples 1-19, or any other method or process described herein.

Example 22 may include an apparatus comprising logic, modules, and/or circuitry to perform one or more elements of a method described in or related to any of examples 1-19, or any other method or process described herein.

Example 23 may include a method, technique, or process as described in or related to any of examples 1-19, or portions or parts thereof.

Example 24 may include an apparatus comprising: one or more processors and one or more computer-readable media comprising instructions that, when executed by the one or more processors, cause the one or more processors to perform the method, techniques, or process as described in or related to any of examples 1-19, or portions thereof.

Example 25 may include a method of communicating in a wireless network as shown and described herein.

Example 26 may include a system for providing wireless communication as shown and described herein.

Example 27 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. An apparatus comprising:
   memory to store sounding reference signal (SRS) configuration information; and
   processor circuitry, coupled with the memory, to:
      retrieve the SRS configuration information from the memory, wherein the SRS configuration information includes an indication of multiple SRS resources, wherein each respective SRS resource is associated with a respective antenna port of a user equipment (UE) for a first mode (Mode 1) of full power uplink operation, or the multiple SRS resources are associated with multiple antenna ports of the UE for a second mode (Mode 2) of full power uplink operation; and
      encode a message for transmission to the UE that includes the SRS configuration information.

2. The apparatus of claim 1, wherein the SRS configuration information further includes an indication of a codebook subset associated with an antenna selection transmission precoding matrix indicator (TPMI) for the Mode 1 operation.

3. The apparatus of claim 1, wherein the SRS configuration information is included in downlink control information (DCI).

4. The apparatus of claim 3, wherein the DCI is DCI format 0_1.

5. The apparatus of claim 1, wherein the processor circuitry is further to receive a report from the UE that indicates one or more transmission precoding matrix indicators (TPMIs) capable of supporting full power transmission for the Mode 2 operation.

6. One or more non-transitory computer-readable media storing instructions that, when executed by one or more processors, are to cause a next-generation NodeB (gNB) to:
   determine sounding reference signal (SRS) configuration information that includes an indication of multiple SRS resources, wherein each respective SRS resource is associated with a respective antenna port of a user equipment (UE) for a first mode (Mode 1) of full power uplink operation, or the multiple SRS resources are associated with multiple antenna ports of the UE for a second mode (Mode 2) of full power uplink operation; and
   encode a message for transmission to the UE that includes the SRS configuration information.

7. The one or more non-transitory computer-readable media of claim 6, wherein the SRS configuration information further includes an indication of a codebook subset associated with an antenna selection transmission precoding matrix indicator (TPMI) for the Mode 1 operation.

8. The one or more non-transitory computer-readable media of claim 6, wherein the SRS configuration information is included in downlink control information (DCI).

9. The one or more non-transitory computer-readable media of claim 8, wherein the DCI is DCI format 0_1.

10. The one or more non-transitory computer-readable media of claim 6, wherein the instructions are further to receive a report from the UE that indicates one or more transmission precoding matrix indicators (TPMIs) capable of supporting full power transmission for the Mode 2 operation.

11. One or more non-transitory computer-readable media storing instructions that, when executed by one or more processors, cause a user equipment (UE) to:
   receive a message containing sounding reference signal (SRS) configuration information that includes an indication of multiple SRS resources, wherein each respective SRS resource is associated with a respective antenna port of the UE for a first mode (Mode 1) of full power uplink operation, or the multiple SRS resources are associated with multiple antenna ports of the UE for a second mode (Mode 2) of full power uplink operation; and
   perform power scaling based on the SRS configuration information.

12. The one or more non-transitory computer-readable media of claim 11, wherein the power scaling for Mode 1 operation is determined based on a number of antenna ports with a non-zero physical uplink shared channel (PUSCH) transmission power divided by a maximum number of SRS ports in the respective SRS resource.

13. The one or more non-transitory computer-readable media of claim 11, wherein the power scaling for Mode 1 operation is determined based on a number of antenna ports with a non-zero physical uplink shared channel (PUSCH) transmission power divided by an actual number of SRS ports in an SRS resource.

14. The one or more non-transitory computer-readable media of claim 11, wherein the power scaling for Mode 2 operation is determined to be 1 for a transmission precoding matrix indicator (TPMI) that can support full power transmission.

15. The one or more non-transitory computer-readable media of claim 11, wherein the power scaling for Mode 2 operation is determined based on a number of non-zero physical uplink shared channel (PUSCH) ports divided by a number of SRS antenna ports of the indicated SRS resource for a transmission precoding matrix indicator (TPMI) that cannot support full power transmission.

16. The one or more non-transitory computer-readable media of claim 11, wherein the SRS configuration information further includes an indication of a codebook subset associated with an antenna selection transmission precoding matrix indicator (TPMI) for the Mode 1 operation.

17. The one or more non-transitory computer-readable media of claim 11, wherein the SRS configuration information is included in downlink control information (DCI).

18. The one or more non-transitory computer-readable media of claim 17, wherein the DCI is DCI format 0_1.

19. The one or more non-transitory computer-readable media of claim 11, wherein the instructions are further to encode, for transmission to a next-generation NodeB (gNB), a report that indicates one or more transmission precoding matrix indicators (TPMIs) capable of supporting full power transmission for the Mode 2 operation.

\* \* \* \* \*